June 14, 1932. M. V. PROUSE 1,863,544
ATTACHMENT FOR FISHHOOKS
Filed Oct. 24, 1929

INVENTOR
Marge V. Prouse

Patented June 14, 1932

1,863,544

UNITED STATES PATENT OFFICE

MARGE V. PROUSE, OF MINNEAPOLIS, MINNESOTA, ASSIGNOR OF FORTY-NINE ONE-HUNDREDTHS TO ARTEMUS O. CORNWELL, OF MINNEAPOLIS, MINNESOTA

ATTACHMENT FOR FISHHOOKS

Application filed October 24, 1929. Serial No. 402,105.

This invention relates to a new novel and useful attachment for fish hooks, which when so attached will allow bait when placed upon the fish hook to slide along the shaft of the fish hook up underneath the attachment to any desired position, when by pressing the pin point of the attachment into the bait such bait is thereby firmly held in an outstretched position, which is most desirable way to have bait when trolling or casting for fish.

To attain this end I equip a fish hook with an attachment in the manner shown, a clasp having a spring and a pin extending from the eye end of the fish hook and with reference to the following drawing it will be seen that I form this clasp as shown:

The full objects and advantages of my invention will appear in connection with the detailed description thereof, and the novel features of my inventive idea will be particularly pointed out in the claims.

In the accompanying drawing which illustrates a practical embodiment of my invention,—Fig. 1 is a side elevational view of the attachment. Fig. 2 is a side elevational view showing the attachment secured to a fish hook. Fig. 3 is a side elevational view showing the bait attached. Fig. 4 is a top plan view showing the bait attached.

Fig. 1 shows the attachment before being attached to the fish hook, A being the short stub which is to be attached to the fish hook at its eye end and securely fastened thereto by soldering, though other means for fastening it may be used. B is a short shaft formed by bending the metal of the clasp at or near to a right angle from the shaft of the fish hook. C is a coil spring also formed of the metal of the clasp and may consist of one or more coils. D is a shaft extending from the coil spring C, and in a direction toward the hook end of the fish hook. E is the pin point of the attachment and angles in toward the shaft of the fish hook, and is for piercing and holding bait.

Fig. 2 shows the attachment as attached to the fish hook the stub A being placed at the eye end of the fish hook and may be attached in any manner which will conveniently and firmly hold the attachment in its wanted position with relation to the shaft of the fish hook. F is that part of the fish hook between the hook end and the eye end of the fish hook and will hereafter be designated the shank of the hook. With reference to the drawing on Figures 1, 2, 3 and 4, and the letters thereon as indicating different parts it will be taken to mean that such letters throughout indicate the same part no matter in which figure they appear.

Figure 1:
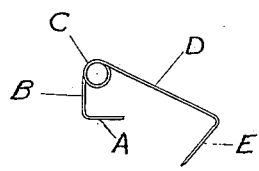
Figure 2:
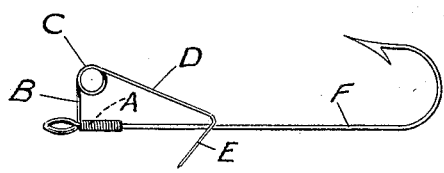
Figure 3:
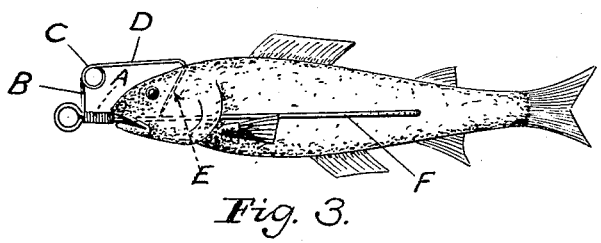
Fig. 3 shows a baited hook with a side view of a minnow as bait, the hook end of the fish hook having been passed into the minnow's mouth and out through its gills, then through the minnow near its tail, the minnow's head having been pushed up underneath the clasp attachment, with the pin point E, pressed into minnow to hold it in that position.
Figure 4:
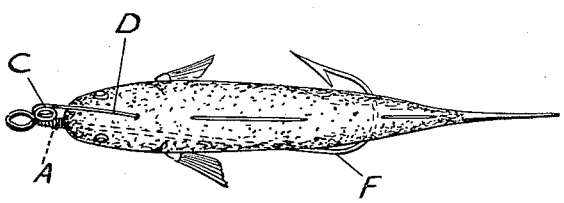
Fig. 4 shows a top view of Figure 3 and is given merely to show more clearly the manner of placing the bait on the hook as shown.

The attachment is preferably made of spring wire but may be any other suitable material, and the coil spring C may be dispensed with though considered an asset as it gives a better tension on shaft D.

The position of the attachment, where attached to the fish hook, relative to the angle of the hook end of the fish hook from its shaft, is not material but may be fastened at any angle found most desirable.

I claim the herein described attachment for a fish hook as follows:

1. An attachment for fish hooks having a shank and an eye end, comprising a member extending out at substantially a right angle from said eye end, a member normally extending in inclined relation from the outer end of said first member toward said shank, a member extending from the inner end of said second member toward said shank, the free end of said third member being sharp, and resilient means tending to hold said third member close to said shank.

2. An attachment for fish hooks having a shank and an eye end, comprising a member extending out at substantially a right angle from said eye end, a member normally extending in inclined relation from the outer end of said first member toward said shank, a coil spring connecting said second member with said first member, and a member extending from the inner end of said second member toward said shank, the free end of said third member being sharp and said spring tending to hold said third member close to said shank.

3. An attachment for fish hooks having a shank and an eye end, comprising an upper member, means for securing said member to said eye end so as to extend out at substantially a right angle, a member normally extending in inclined relation from the outer end of said first member toward said shank, a coil spring connecting said second member with said first member, and a member extending from the inner end of said second member toward said shank, the free end of said third member being sharp and said spring tending to hold said third member close to said shank.

I herewith pray that Letters Patent be granted me on the above.

MARGE V. PROUSE.